US008943956B2

(12) United States Patent
Miller

(10) Patent No.: US 8,943,956 B2
(45) Date of Patent: Feb. 3, 2015

(54) DECORATING APPARATUS

(71) Applicant: John Hart Miller, Aurora, CO (US)

(72) Inventor: John Hart Miller, Aurora, CO (US)

(*) Notice: Subject to any disclaimer, the term of this patent is extended or adjusted under 35 U.S.C. 154(b) by 0 days.

(21) Appl. No.: 13/694,538

(22) Filed: Dec. 11, 2012

(65) Prior Publication Data

US 2013/0156944 A1  Jun. 20, 2013

Related U.S. Application Data

(60) Provisional application No. 61/630,576, filed on Dec. 15, 2011.

(51) Int. Cl.

| | | |
|---|---|---|
| *B41N 1/24* | (2006.01) | |
| *B41L 13/02* | (2006.01) | |
| *B41L 47/06* | (2006.01) | |
| *B41F 15/36* | (2006.01) | |
| *B05D 7/24* | (2006.01) | |
| *B44C 1/00* | (2006.01) | |
| *B05C 19/00* | (2006.01) | |
| *A23P 1/08* | (2006.01) | |
| *A23G 3/28* | (2006.01) | |
| *B05C 17/06* | (2006.01) | |
| *B05C 21/00* | (2006.01) | |

(52) U.S. Cl.
CPC ................ *B05C 21/005* (2013.01); *B05D 7/24* (2013.01); *B44C 1/00* (2013.01); *B05C 19/00* (2013.01); *A23P 1/082* (2013.01); *A23G 3/28* (2013.01); *B05C 17/06* (2013.01)
USPC ......... 101/114; 101/127.1; 222/565; 427/197

(58) Field of Classification Search
CPC .......... A47J 47/01; A47G 19/34; A23G 3/20; B41N 1/24; B41L 13/02; B41L 47/06; B41F 15/02; B41F 15/34; B41F 15/36; B41K 1/32; B05C 17/08
USPC ............... 427/180, 197; 101/114, 123, 127.1, 101/128, 128.1, 125; 222/565, 189.02, 222/189.05, 189.11, 410, 411; 209/233, 209/255, 358, 417; 366/195, 316, 317, 344; 118/504

See application file for complete search history.

(56) References Cited

U.S. PATENT DOCUMENTS

| | | | | |
|---|---|---|---|---|
| 1,005,991 | A | * | 10/1911 | McEachron ................. 366/276 |
| 2,607,491 | A | | 8/1952 | Dennis |
| 3,363,586 | A | | 1/1968 | Jernigan et al. |
| 3,415,376 | A | | 12/1968 | Smith et al. |
| 5,850,923 | A | | 12/1998 | DeCoster et al. |
| 6,242,026 | B1 | | 6/2001 | Feeley |
| 8,006,615 | B1 | * | 8/2011 | Allen et al. .................. 101/125 |
| 2006/0019005 | A1 | | 1/2006 | Talbot |
| 2006/0204626 | A1 | | 9/2006 | Talbot |
| 2009/0260567 | A1 | * | 10/2009 | Ozuna et al. ................. 118/600 |

FOREIGN PATENT DOCUMENTS

GB     2457295 A  *  8/2009  ............. A47J 31/40

* cited by examiner

*Primary Examiner* — Blake A Tankersley

(57) ABSTRACT

Decorating devices for creating a desired decorative pattern of edible or non-edible particulate material on the surface of an article by causing particles, granules, etc. of the particulate material to pass through a pattern comprising a plurality of holes in a template are disclosed. The method of using the devices to decorate the surface of articles is also disclosed.

17 Claims, 6 Drawing Sheets

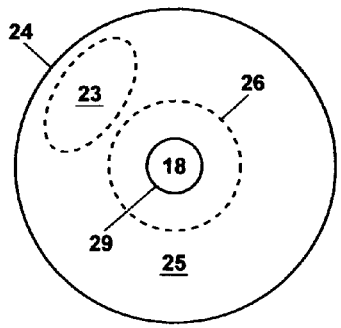
Figure 2
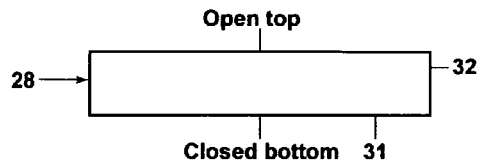
Figure 3
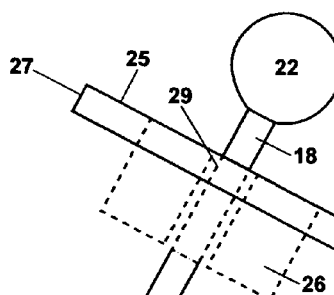
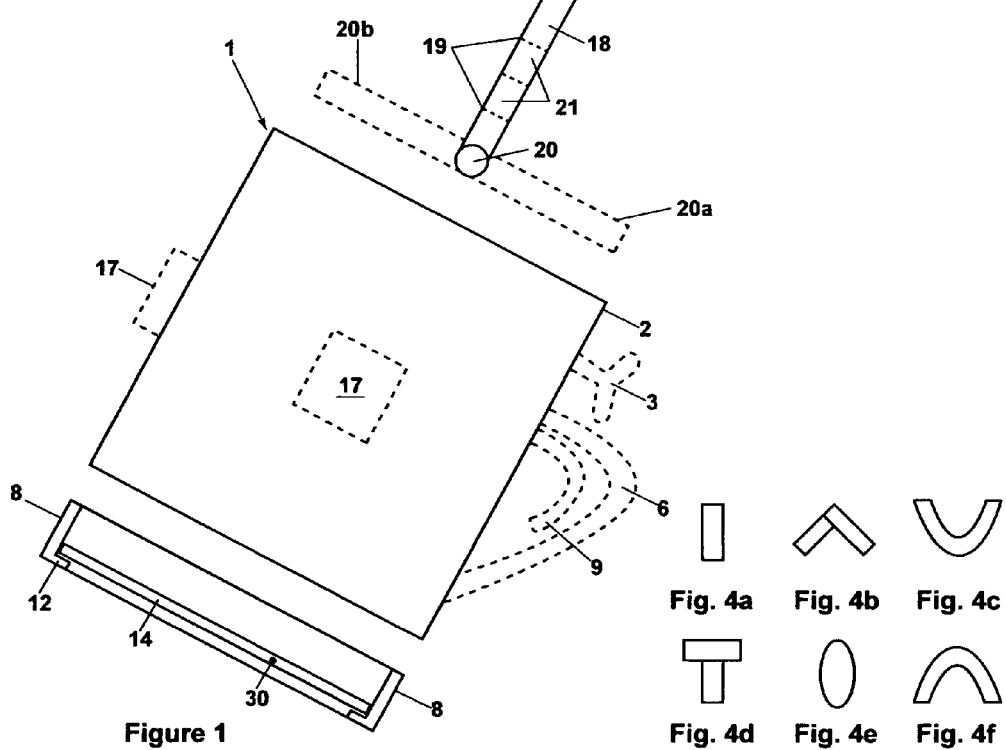
Figure 1
Fig. 4a  Fig. 4b  Fig. 4c
Fig. 4d  Fig. 4e  Fig. 4f

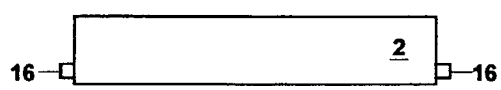
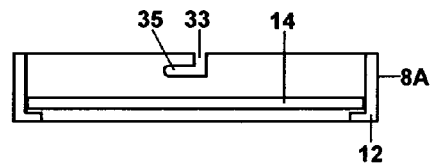
Figure 6
Figure 7
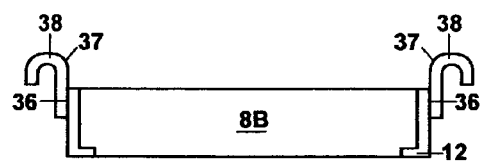
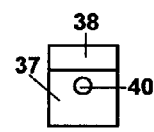
Figure 8
Figure 9
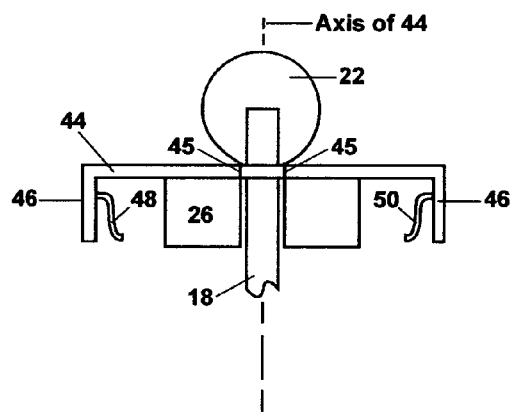
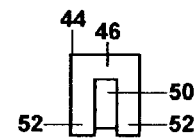
Figure 10
Figure 11
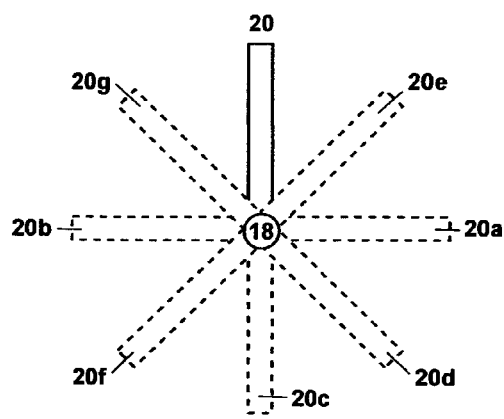
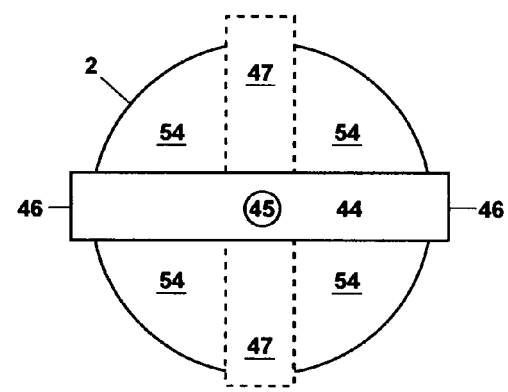
Figure 13
Figure 12

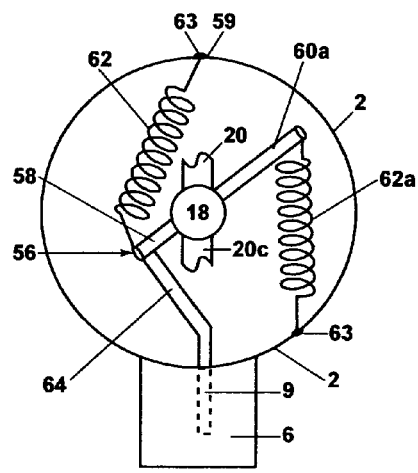
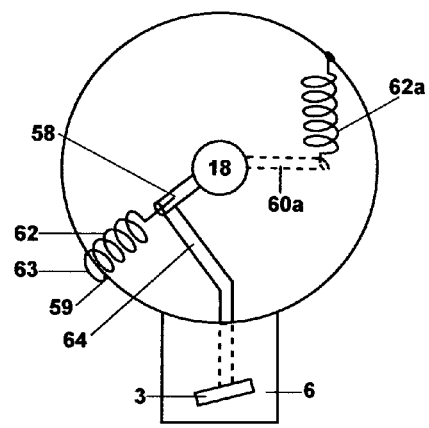
Figure 14
Figure 15
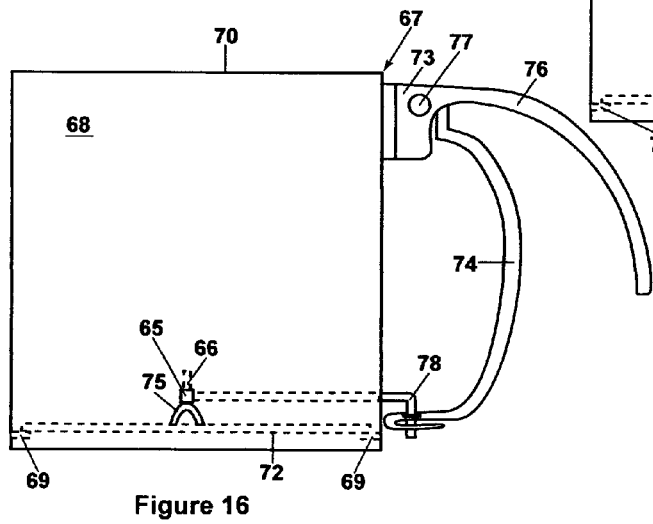
Figure 16
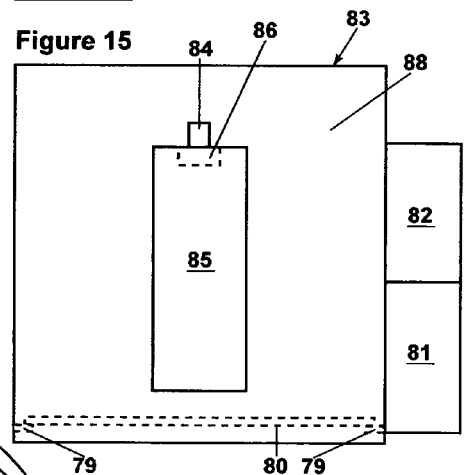
Figure 17

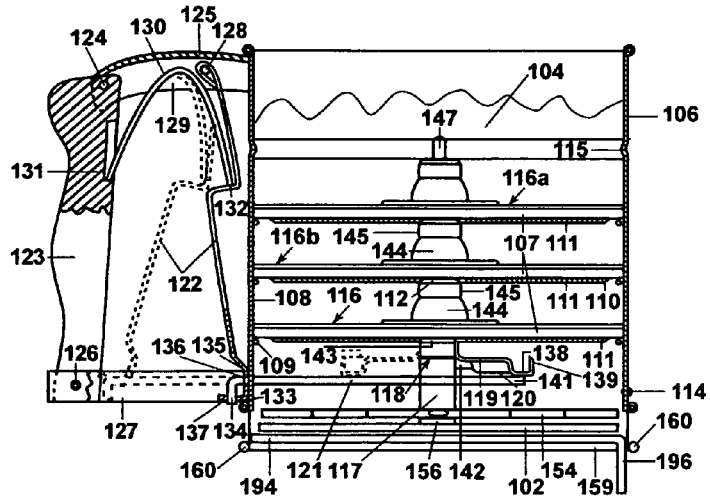
Figure 18
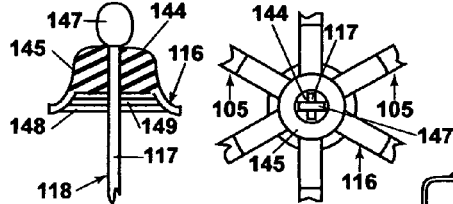
Figure 21  Figure 20
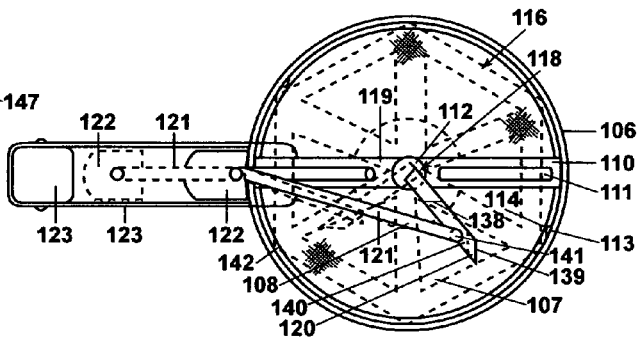
Figure 19
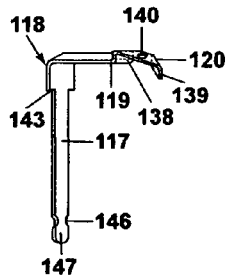
Figure 22
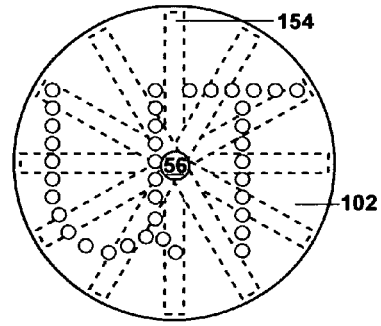
Figure 23

DECORATING APPARATUS

The invention involves various apparatus for decorating edible and inedible articles with designs, patterns, logos and the like using edible and inedible powder(s), and methods of using the various apparatus. This application claims the benefit of the disclosure in Provisional Patent Application No. 61/630,576 filed on Dec. 15, 2011.

BACKGROUND

It is known to decorate edible items such as cakes, cupcakes, ice cream items and the like and non-edible items such as floor and wall tile, circuit boards and the like using liquid applicators and/or wet paste or slurry applicators. In many instances it would be very useful and much simpler to be able to apply patterns, decorations, designs, logos and the like using edible and inedible powders without having to use liquid applicators or applicators for wet paste or slurries disadvantages accompanying such applicators and application.

SUMMARY OF THE INVENTION

The invention includes decorating devices or apparatuses comprising a partial enclosure including, but not limited to, a barrel, topless and/or bottomless can or mug, all an enclosure for particulate decorating material, a template or stencil (hereafter template) containing a plurality of holes therethrough, the plurality of holes forming a desired pattern, a template holder for supporting the template in place within the enclosure, and a mechanism that when put into motion, energized, and/or activated will move at least some of the particulate decorative material to pass over and through at least most of the plurality of holes in the template, preferably all of the holes, to form a desired pattern on an article located beneath the devices or apparatuses. The particulate material can be edible or non-edible and can include many kinds of granual, particle, spheres, cubes or near cubes, and powder material having a particle size of less than about ⅜ inch in diameter including less than 5/16 inch, less than ¼ inch, less than 3/16 inch, and smaller particles as will be described in more detail or examples below. The hole size should be small enough that the particulate decorative material does not continue to significantly flow through the holes unless the device and/or the particulate material is being agitated or vibrated. By "not continue to significantly flow" is meant that the flow is less than what would substantially or significantly detract from the desired pattern on the article when the device or apparatus is moved to above and away from above the article to be decorated. The mechanism can include a vibrator assembly for agitating the device and/or the particulate material, an agitator assembly or a distributor for agitating and/or distributing the particles of the particulate material, and a combination thereof.

The invention includes a low cost apparatus for easily and quickly applying various powders in patterns, designs, logos and the like of most any kinds, hereinafter referred to as decoration, using both edible and inedible powders of essentially all kinds. The apparatus can be used to apply such decorations to items that have been heated, prepared, cooked or frozen and are ready to serve, or near ready to serve and also to items that are to be later cooked, frozen, heat treated or fired to melt, sinter or consolidate the decorations. The apparatus can be very simple or more complex with many variations, options, sizes, and conveniences added with its uses many and varied, permitting cooks, bakers, kitchen workers, helpers, laborers, decorators, artists, customers and children to accomplish things heretofore nonexistent, or overly complex. The term "decoration" includes the patterns formed by a plurality of holes of any shape in a plate or sheet of metal, plastic, paper, wood, or stiff cloth with the holes forming a recognizable pattern, but excludes a grid or checkerboard pattern of round, square or rectangular holes such as the screens and screen plates found in known in flour sifters. However, any type of flour sifter that provides for sifting without moving the flour sifter around, such as from side to side, can be modified, as described in detail herein, to make the decorating apparatus of the present invention and many kinds that will permit operation with one hand while the other hand can be used to position and reposition the item(s) being decorated.

By particulate material is meant granules, pieces, particles, spheres, polygonal shaped pieces and powder including having diameters of any practical size, but preferably those having including a particle size that is smaller than about ⅜, ¼, 7/32, 3/16, ⅛, 3/32, 1/16, 1/32 inch or minus 7 mesh, typically less than 20 mesh or less than 35 mesh, more typically less than 65 mesh and often less than 100 mesh and any combination thereof (all Tyler equivalent mesh sizes stated above). The particulate decorative material can be edible including, but not limited to, small seeds, nuts and nut pieces, particles, dry fruit pieces, vegetable pieces, granular, confection or powdered sugar, cocoa, coffee, chai, tea, pieces of or powdered candy, sprinkles, dots, red hots, cinnamon, nutmeg, other spices and flavoring materials including fat, salt pork, jerky, salts, various peppers, and colored particles, sprinkles and the like, and any combination of two or more of these in any ratio. The particles are preferably dry, but can also be freeze dried or frozen. The particulate material can be inedible including, but not limited to, glazes, stains, pigments, particulate conducting materials like metals, carbon, graphite, sawdust, wood particles and the like. The particulate decorative material can be mixtures of two or more separate materials and can include one or more powders, etc. of thermoplastic material including edible waxes, paraffin, polymers, copolymers, rosins, pitch, asphalt, and the like.

The decorating device or apparatus comprises a container or part of a container like a barrel of a container to hold the powder, the barrel acting in cooperation with a template containing a one or more holes therethrough forming a desired pattern and an agitator or a plurality of agitators attached to a shaft mostly located along the axis of the barrel that can be rotated at least some degrees to cause one or more agitators to pass over all the holes in the template. Operation of the decorating device of the invention dispenses the particulate decorative material, e.g. powder(s), in a desired decorative pattern onto any article that one desires to be decorated. The shaft is positioned on or in the container, barrel and having a powder agitator at or near one end and, optionally, a shaft rotator attached to the shaft. The template comprised of a layer of material is positioned beyond and near the bottom of, and/or inside, the barrel or container and below the agitator, the template having a plurality of openings therein forming a desired decoration. Preferably, a support or holder for said template is located near or at the bottom of the barrel. The template holder can be anything that holds the template in place without interfering with the pattern formed by the holes in the template and can include, but not be limited to, a continuous or discontinuous open ring on the inside of the enclosure, container, such as a tube or barrel and located along the length of the barrel or container. It can also include spaced apart pins, knobs, slots, brackets, or any other suitable support(s), preferably supporting the template along at least portions of the outer periphery of the template. The support or holder for the template can be inside the barrel or removably attached to the bottom portion of the barrel, or can be a part of the lower portion of the barrel.

The openings, holes in the template forming the patterns, decorations, etc. can have a small diameter usually of about ¼ inch or less, depending upon the particle size of the particulate material desired for the decoration and often is at least about 1/32 or 1/16 inch, more typically at least about 5/64 inch, 3/32 inch or ⅛ inch and even more typically at least about 9/64 inch. The maximum diameter of the openings should be no larger than about 1/32-3/32 larger than necessary to get the desired powder to pass through the plurality of holes. It is also permissible to make some of the holes larger than other of the holes in a pattern or decoration to put emphasis on some part(s) of the pattern or decoration. The container is preferably cylindrical with a round cross-section, but can be of other shapes typical for containers including such as having cross-sections of oval, triangular, diamond, rectangular, pentagonal, hexagonal shapes, and even shapes having more than six sides, but the agitators will often have to number more than 4 for such cross-sections and will have to be of different lengths and moved only a limited number of degrees. Barrels having a cross section other than a circle are normally undesirable. The container or barrel can have an open top, partially open top, a closed top, a fixed top or a removable top. The diameter of the container or barrel is a matter of choice and largely depends on the size of the decoration desired and the type of particulate decorative material desired.

The shaft, when the device contains a central shaft, can extend above the top of the container or barrel, but need not do so. While various things, devices or mechanisms can be optionally attached to the shaft at different places along its length to aid in rotating the shaft, none need be present. The shaft can be solid or hollow and of any cross-section shape, within reason, except it should be round where it passes through a hole in the top and/or one or more bushings or bearings supporting and/or guiding the shaft. The agitator can number one or more, preferably 3 or more, and can be rods, wires, blades or most any functionally equivalent shape and extend outward from the shaft making an angle with the shaft preferably of 90 degrees but this can vary some, such as +/−1, 2, 3, 4, or 5 degrees so long as this variation does not prevent the desired decoration from being formed properly in a timely manner.

The template having a plurality of holes, openings therethrough forming the desired pattern, outline or decoration is preferably, but not necessarily, made of a rigid layer of material that can be easily cleaned or so inexpensive that it can be practically discarded after the desired use. Some suitable materials include Mylar®, Teflon® sheet, metal sheet, plastic sheet, paper and coated paper of various types and materials that are equivalent for this use. One material that is easy to make and store is a transparent plastic sheet of the kind(s) used to make throw-away packages for food products like apples, cookies, cupcakes and the like and holes are easily punched, die cut in this material or even heat melted in these materials. The openings or holes in the material should be large enough to allow most of the particles of the powder being used to pass through the openings, but not so large that too much powder passes through the holes, particularly when the device is being moved to, or from, the article being decorated. It is preferred, but not necessary, that the sides of the holes be tapered such that the diameter of the holes at the top of the template adjacent the agitator is smaller than the diameter of holes on the opposite or bottom side of the template. The taper need not be large with a difference in the diameters of the holes being about 1/16-1/32 inch or often less from the top of the holes to the bottom of the holes working well. The tapered holes will present less obstruction and tend to keep the holes from plugging with the powder.

Optionally, the apparatus can further comprise a mesh screen located between the agitator and the material for preventing the powder from falling through the holes in the material until it is desired that they do so. In such embodiments, a second agitator positioned just above or in contact with the top surface of the template can also be used. The apparatus can further comprise any one of various devices for rotating the shaft and also permanent or removable stops limiting the amount of movement of the agitator.

Some embodiments of the apparatus require using two hands, one to hold the container or barrel and one to turn the shaft. Other embodiments permit the shaft and/or the agitator to be turned with the same hand used to hold the barrel or container, leaving the other hand free to hold, position, lift, lower and/or otherwise move the item being decorated, or for other things. Also, embodiments using a vibrator to agitate the device and/or the particulate decorative material, can be held with one or both hands while the vibrator mechanism can be activated and deactivated with a thumb or finger of a single holding hand.

The invention includes methods of using the various devices described above to decorate a plethora of items, an abbreviated list including edible items including pizzas, pies, cakes, crepes, muffins, pastries, cobblers, soups, various kinds of chocolate drinks, various tops of milks, malted milks, milk shakes, sundies, cones, various kinds of coffee drinks, stews, gelitin, puddings, yogurts, ice cream, sherbert and non-edible items like wall and floor tile, glass, metals, wood, lumber, furniture, circuit boards, foam pieces, polymers and composites, of all kinds and shapes, the pattern normally to be on the non-edible items by various heat treatments after the decoration is applied.

The edible powders can include almost any edible product including sugar or most any kind and color, coffee, cocoa, frozen ice cream or sherbert dots, any kind of flour or meal, any spice, any kind of salt, any kind of pepper, citrus powder, any kind of artificial sweetener, etc. The non-edible powders can include any kind of pigment, stain, metal, glass, inorganic glaze, any kind of carbon, alumina, gold, silver, platinum group metal, etc. Any reasonable particle size can be used so long as much of the powder used passes through the holes in the template forming the decoration. More typically, particle sizes of less than about 105 micrometers (minus 140 U.S. Standard mesh) is typical even finer powder such as smaller than 88 micrometers (minus 170 mesh), smaller than 74 micrometers or microns (minus 200 mesh), smaller than 63 micrometers (minus 230 mesh), smaller than 53 microns (minus 270 mesh), smaller than 44 microns (minus 325 mesh), smaller than 37 microns (minus 400 mesh), smaller than 20 microns, and smaller than 10 microns are all typically used, depending upon the powder available and the size of the openings in the template forming the desired decoration.

The method comprises placing the desired particulate material, such as granules or powder for making the pattern into the container or barrel of the apparatus, usually after the desired template has been installed in the apparatus and usually, but not necessarily, while the bottom of the barrel and template is resting on a flat surface or in an optional powder retainer, but the powder can be added to the barrel or container while the barrel or container is tilted with its axis between vertical and horizontal or up to completely horizontal. Next the apparatus is held over the article to be decorated, preferably at least about ⅛ inch above the surface to be decorated, and the shaft connected to the agitator is rotated in one direction, or preferably back and forth, once or enough times to deliver the powder through the holes of the template and onto the surface of the article until the desired decoration has been achieved. Then the rotation of the shaft is stopped and the apparatus is either laid on its side on a generally flat surface such as a table, counter, cup, plate, saucer, etc. or carefully set down on a flat surface, or if an optional retainer cup is available, it can be set into the retainer. If more than one decoration is desired on the article being decorated, the same device, or a different device holding a different template and/or powder, is moved to a different location above the article surface and the above procedure is repeated. In other embodiments in which the apparatus structure enables one to hold the apparatus and rotate the shaft with the same hand, or otherwise move the particles over the holes, the article can be placed and/or moved with the other hand, with or without one or more other aids, such as a rotating platter or a flat surface, a surface that can be easily moved back and forth along one or more tracks, etc.

Herein, when a range of number values is disclosed it is to be understood by those of ordinary skill in the appropriate art(s) that each numerical value in between the upper limit and the lower limit of the range is also disclosed, to at least 0.01 of a full number. Thus in a range of 1 to 10, this includes 2.04 to 10, 3.06 to 8 or 8.50, and so on. The addition of a new limitation in a claim previously stating from 2 to 7 changing it to from 3-7 or 4-6 would not introduce new matter whether those new ranges were specifically disclosed in the specification or not because of this explanation of the meaning of a disclosed broader range, such as 1-10. This meaning of a range is in keeping with the requirement in 35 USC 112 that the disclosure be concise.

Further, when the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 1 is an exploded, perspective view of a simple embodiment of the decorating device of the invention.

FIG. 2 is a plan view of the top of the device shown in FIG. 1 with a knob removed for a better view.

FIG. 3 is a front view of an optional holder for the device shown in FIGS. 1 and 2.

FIGS. 4a-4f are cross sections taken perpendicularly through alternative agitators useful in the device shown in FIGS. 1 and 2.

FIG. 6 is a partial front view of a vertical cross section through the vertical axis of an alternative barrel of the device shown in FIGS. 1 and 2.

FIG. 7 is a front view of a vertical cross section through the vertical axis of an alternative template holder and template of the device shown in FIGS. 1 and 2.

FIG. 8 is a front view of a vertical cross section through the vertical axis of another alternative template holder of the device shown in FIGS. 1 and 2.

FIG. 9 is a front view of a bracket used on the alternative template holder shown in FIG. 8.

FIG. 10 is a partial front view of a vertical cross section through the vertical axis of the device shown in FIG. 1 showing an alternative top for the device.

FIG. 11 is a partial front view of the alternative top shown in FIG. 10.

FIG. 12 is a partial plan view of still other alternative tops for the device shown in FIG. 1.

FIG. 13 is a bottom view of a shaft and various alternative agitator arrangements for the device shown in FIG. 1.

FIG. 14 is a partial plan view of other embodiments of the device 1 without the top in place and without the agitators and template.

FIG. 15 is a partial plan view of still other embodiments of the device 1 without the top in place and without the agitators and template.

FIG. 16 is a front view of another embodiment without a shaft and that can be operated with one hand.

FIG. 17 is an end view (handle side) of another embodiment operated with one hand and containing a vibrator assembly to agitate the particulate material.

FIG. 18 is a vertical cross-section of another embodiment containing two or more agitators and one or more screens.

FIG. 19 is a bottom view of the embodiment shown in FIG. 18 with the template removed.

FIG. 20 is a perspective view of a one-piece crank element used in the embodiment shown in FIGS. 18 and 19.

FIG. 21 is a plan view of an upper agitator used in the embodiment of FIG. 18.

FIG. 22 is a sectional detail on the line 21-21 of FIG. 4.

FIG. 23 is a bottom view of a template installed in the device shown in FIGS. 18 through 22, and showing in phantom an agitator mounted above the template.

DETAILED DESCRIPTION OF SOME EMBODIMENTS, INCLUDING THE BEST MODE

Figures 5A, 5B, 5C:
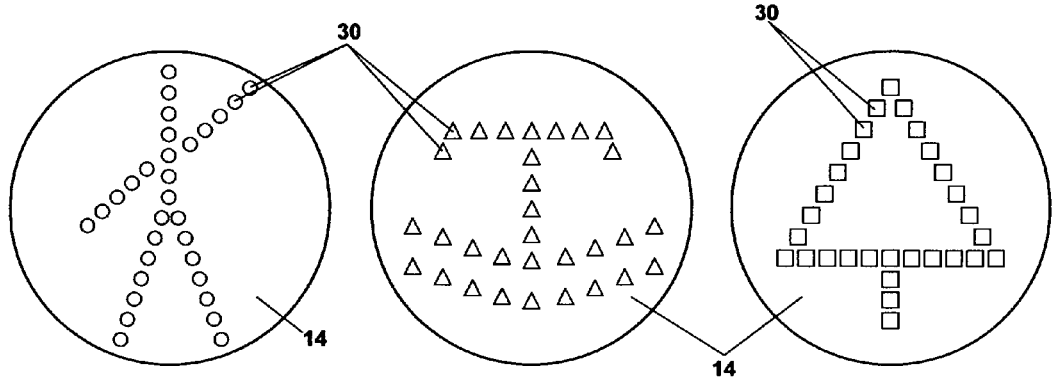
FIGS. 5a-5i are plan views of just a few of the many possible hole patterns in templates useful in the device shown in FIGS. 1 and 2.
Figures 5D, 5E, 5F:
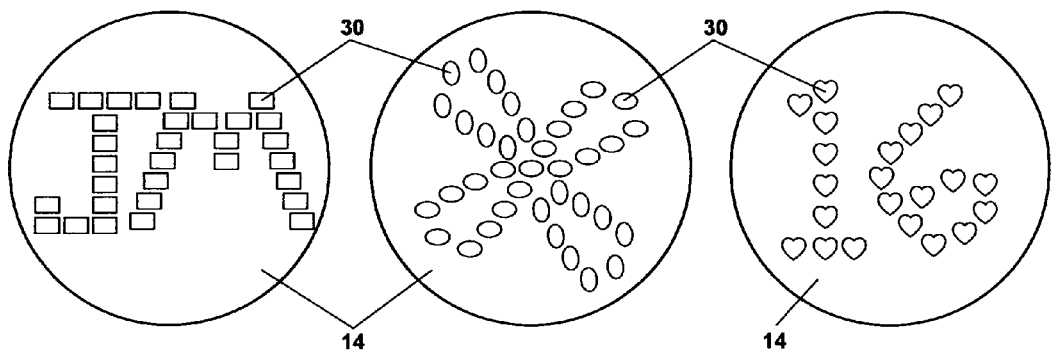
Figures 5G, 5H, 5I:
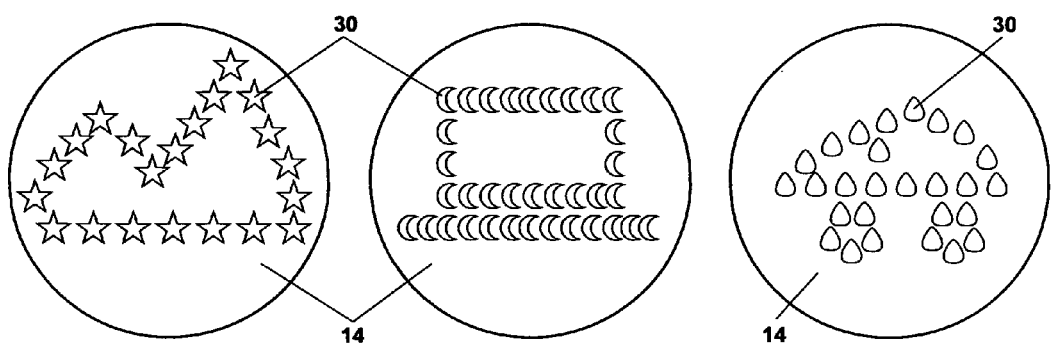

FIG. 1 is an exploded, perspective view of one embodiment of the decorating device 1 of the invention. The device comprises a hollow, tubular barrel 2 that can have an optional handle 6 to make it easier to hold and position properly over the article to be decorated. A bottom ring like template holder 8, having an inside diameter (ID) such as to provide a snug fit on the outside diameter (OD) of the barrel 2, has a circumferential lip 12 on its lower end for holding a template 14, the template 14 having a plurality of holes therethrough, the holes forming a desired pattern. For use, the bottom ring 8 holding the template 14 would be slid onto an end of the barrel 2 and pushed onto the barrel 2 until the circumferential edge of the barrel 2 is snug against either the outer circumferential portion of the template 14 or against the upper surface of the lip 12, depending upon how the device 1 is designed to operate. Alternatively, the OD of the template holder 8 can be such as to fit snuggly into the ID of the barrel 2, but the former configuration is preferred. The barrel 2 can have an optional finger(s) handle 6 attached to allow the apparatus of the invention to be held during use with one or more fingers of one hand instead of a few fingers and a thumb. An optional trigger 9, hook or push button 3 is for rotating the shaft 18 with a mechanism attached to the shaft 18 to be shown below and in FIGS. 14 and 15. Instead of using a rotatable shaft 18 an agitator 20, one or more optional spring (like a clockspring), battery, or electrical powered vibrators 17 can be used to power the decorating device 1 as will be described in more detail in the description of a later embodiment shown in FIG. 17.

The height of the barrel 2 can be from about 0.25 inch to as tall as desired. If only used occasionally and it is desired to have a decorating device 1 dedicated to one or more different powders, e.g. to leave the powder in the device so it is ready for the next use, the height of the barrel 2 might be less than 1 inch, and if the decorating device 1 is intended for frequent use, e.g. several or many times a day, the barrel can be 4, 6 inches or more enabling it to hold a lot of decorating powder so it doesn't have to be refilled as often. Of course, it is necessary to adjust the length of the shaft 18 on the dynamic assembly 7 to accommodate the height of the barrel 2. It is also possible to make the shaft 18 in multiple pieces 21, as shown by the dashed lines 19 in FIG. 1, that can easily be separated to change the length of the shaft 18. The multiple pieces 21 of the shaft can fit together in numerous know ways, e.g. by threading, by male/female snug joints, etc.

A dynamic assembly 7 of the device comprises a cap 24 (FIG. 2) for the top end of the barrel 2, the cap 24 being circumferential and having a short, circumferential sidewall 27 having an ID such as to provide a snug fit over the OD of the barrel 2. Alternatively, the OD could be such as to provide a snug fit inside the ID of the barrel 2, but the former is preferred. The top 25 of the cap 24 can be continuous except for a hole 29 in its center for a shaft 18 to pass through, and can have one or more optional openings 23 (FIG. 2) therethrough for adding a powder, and for removing a powder by upending the device 1 allowing the powder to pour out through one or more optional openings 23. An optional bushing 26 having a hole passing through it to accommodate the shaft 18 in a way that keeps the shaft in a proper position for operation and still allows the shaft to rotate easily. The optional bushing 26 is attached in any known manner to the underside of the top 25, such as with one or more screws (not shown). The cross section of the shaft 18, at least the part that passes through a round hole in the top 25 and/or the optional bushing 26, is preferably a circle, but other portions of the shaft 18 can be of any shape.

Attached to the bottom of the shaft 18, or a part of the shaft 18 bent to form an angle of 90 degrees, are one or more agitators 20 that extend outwardly at generally 90 degrees, generally in this instance meaning +/−1-2 or up to at least about 5 degrees so that the entire bottom surface of each agitator 20 rubs against or is very close to the top of the template 14. The agitator(s) 20 extend from the shaft 18 to at least a distance covering all the holes in the template 14. The purpose of the agitator(s) 20 is to pass close to and past the holes 30 to cause powder in the device 1 to fall through the holes 30 to form the decorative pattern on the surface of the item being decorated. The cross section of the agitator 20 and optional agitators 20a, and 20b is a circle, but many shapes would be suitable. Just a few of the possible alternative cross sections for the agitator(s) 20 are shown in FIGS. 4a-4F, these being in order, a vertical blade (angled blade is also suitable), an inverted V, a U, a T, an oval and an inverted U. Only one or any reasonable number of agitators 20 can be used, but usually 8 or less is adequate. The more agitators 20 that the device has, the lower amount of degrees the shaft 18 needs to be rotated to cause powder to pass through the holes 30 to form the decoration. At the top of the shaft 18 an optional knurled portion, an optional knob 28 or other optional known device or shape can be attached or formed to make it easier to rotate the shaft 18 in one direction or back and forth.

FIG. 3 shows an optional device holder for the device 1, the holder 28 having an open top and a solid bottom 31, the height of a sidewall 32 of the holder being a matter of choice, but usually at least ⅛ inch high and typically about ½-1 inch high. The ID of the device holder 28 is greater than the OD of the template holder 8 such that the sidewall 32 does not interfere with the device 1 as it is set into or is lifted out of the device holder 28 even though the device 1 is inserted and withdrawn with its axis at a slight angle. Preferably the ID of the device holder 28 is at least about 1/16 inch larger than the OD of the template holder 8 and typically is ⅛-¼ inch or up to ½ inch larger.

FIGS. 5a-5f show a few of many possible template patterns with holes 30 of some of the very many various possible hole shapes in the templates 14 forming stick figures, an anchor, a tree, initials or other letters, logos or clover leaf or flower blossums, article shapes, numbers, mountains, a top hat or other hats, a car, an animal, a cup of hot coffee, chocolate, etc., etc. The diameter of the barrel 2 and the template 14 can be of any reasonable desired size depending upon the desired size of the hole pattern and also to the object being decorated, coded, marked etc. Each of the individual holes 30 can be of any shape and any desired combination of shapes. Some of the typical shapes are a circle, an oval, a star, a triangle, a square, a rectangle, any polygonal shape, a flower blossom, a butterfly, a bird, a dog, a cat, and others.

To use the device 1, a template 14 having the desired holes 14 design or pattern is selected and placed in the template holder 8 and the template holder 8 is placed on the bottom of the barrel 2. Next, a desired powder is placed inside the barrel 2 and the dynamic assembly 7 is put in place in and onto the barrel 2. Alternatively, the dynamic assembly 7 can be placed into and onto the barrel 2 prior to adding the desired powder to the barrel 2 followed by pouring the desired powder into the barrel 2 through the optional hole 23 in the top 25 of the dynamic assembly 7. When adding the desired powder to the barrel 2, it is helpful to have the template holder 8 and barrel 2 setting in the optional device holder 29, or to have the template holder 8 and barrel 2 setting on something that can catch any powder that falls through the holes 30 in the template 14 to make it easier to clean up and optionally to put the powder back into the barrel 2 or the container from which it came. When making a decoration on an article using the device of the invention, the device should be held as steady in one place centered above the center of the desired decoration on the article as possible or practical with one hand and using the other hand, rotate the shaft 18 or an optional knob 22 back and forth the appropriate degrees until the desired decoration is formed to the desired density or thickness. With other embodiments of the device it is possible to do this with only one hand, leaving the other hand free to manipulate the article being decorated or for other purposes, as is described below.

Usually a top surface of food and non-food articles is selected for decorating using the decorating device 1 of the invention, but a sloping surface can be decorated as well as long as the slope is not so steep as to cause the powder to miss or partly miss the surface of the food article or to fall past the surface. For decorating edible food articles any edible material that can be ground into a powder can be used in the invention. Some of these include, cocoa, sugar, confectioner's sugar, coffee, tea, spices of all or most kinds, nuts, dried fruit, dried vegetables, etc. For decorating non-edible articles, most any material that can be provided in powder form can be used, some of these including pigments, dyes, glass, ceramics, porcelains, carbon, resins, plaster of Paris, cements, clays, rock of all kinds, dirt, elements, metals, wood, compounds, etc. While normally some of the particle sizes useful in this invention would conventionally be called granular, the term powder, as used in this disclosure, is usually meant particles of less than about ¼ or 3/16 inch or less than about ⅛ inch, typically less than about 3/32 inch or 1/16 inch in diameter. The only bottom limit on the size of the particles is that the average particle size should be larger than that diameter that will cause dry particles to stick together with such tenacity that the powder will not flow through the holes properly to form the pattern decoration as desired, even when vibration of the device is used by energizing the optional one or more optional vibrators 17 (FIG. 1). The vibrators can be battery powered and of a high frequency, low amplitude type, energized with a common switch on the decorating device 1 in a known manner. Where a higher magnitude of vibration is desired, one or more conventional 110-120 volt vibrators can be attached to the device in a known manner with the switch placed in a handy location. The operator U.S. Standard mesh sizes can also be used to define the particle size, particularly for the finer powders, such as minus 20 mesh (−0.841 millimeters), −42 mesh (−0.354 mm), minus 60 mesh (−0.25 mm), minus 100 mesh (−0.149 mm) and on down to minus 325 mesh (−0.044 mm) and even finer for some materials.

The template 14 can be made of most any material, but a material that is easily cleaned and easy to perforate, drill, punch, etc. the holes is preferred. Materials like Teflon™, mylar, nylon, polyethylene, aluminum, stainless steel, and the like are preferred. Preferably, the material used for the template will not cause the powder to stick or cling to the top of the template or the sides of the holes 30. A polished material, including the sides of the holes, of stainless steel or Teflon™ or chrome plated metal is preferred. The thickness of the template should be adequate to keep the tops of the holes on the same plane or within no more than 5 degrees and preferably within 1 or 2-3 degrees from the same plane. An excessive thickness is permissible, particularly when the hole sides are tapered to have a larger diameter at the bottom surface than the diameter of the holes at the top surface of the template.

The holes 30 are of a diameter or general diameter of less than about ¼ or 3/16 inch or less than about ⅛ inch, typically less than about 3/32 inch or 1/16 inch in diameter. The only bottom limit on the size of the holes is that the general diameter should be large enough that the powder flow through the holes to form the desired pattern in a timely manner, even if vibration is required. The hole sizes can also be defined by U.S. Standard mesh sizes, like the description for the powder above. By "general diameter" is meant the smallest distance across the holes, necessary when the shape of the hole is other than a circle, as described earlier.

Many modifications can be made to the decoration device 1 in addition to the optional features already described above. FIGS. 6-9 show a few of many possible other ways of attaching the template holder 8 to the barrel 2. FIG. 6 shows one or more pins 16 attached to the lower portion of the barrel 2 or formed from the barrel 2 in any known manner, for cooperating with one or more slots 33 (FIG. 7) in an alternative template holder 8A. In this case, the ID of the alternative template holder 8A can be such as to form a loose fit with the OD of the barrel 2 such that the template holder 8A can be easily slid onto the lower portion of the barrel 2 such that the pin(s) 16 enter a generally vertical portion of each slot 33 (FIG. 7), each slot 33 having a generally horizontal or holding portion 35 such that when the template holder 8A is rotated after the pin(s) 16 have reached or nearly reached the bottom of the generally vertical portion of the slot(s) 33 to move the generally horizontal portion(s) 35 of the slot(s) 33 partially around the pin(s) 16, the pin(s) 16 will maintain the template holder 8A onto the barrel 2 of the decorating device 1.

Another alternative for attaching the template holder 8 to the bottom portion of the barrel 2 is shown in FIG. 8, a partial front view of a modified template holder 8B. This template holder 8B has one or more brackets 37 attached to the template holder 8B in any suitable way and preferably on an outside surface 36 of the template holder 8B. The one or more brackets 37 preferably have a partial open loop portion 38 large enough for one to put a thumb and/or a finger through the partial loop portion 38. The bracket(s) 37 also have a hole 40 (FIG. 9) located in the proper position to cooperate with the pin(s) 16 to position and hold the template holder 8B in its proper position for use as described above. Preferably the hole(s) 40 have a larger diameter than the diameter of the pin(s) 16 to make it easier to release the bracket 37 in a position for the pin(s) 16 to enter the hole(s) 40. One of several ways of using the template holder 8B is to simply spread a top portion of the bracket(s) 37 outward from the OD of the template holder 8B or further apart, while or prior to slipping the bracket(s) 37 and template holder 8B over the bottom end of the barrel 2 in a position at least near where the hole(s) 40 will align with the pin(s) 16 and then adjust the position accordingly if necessary and release the bracket(s) 37 such that the hole(s) 40 surround the pin(s) 16. Any combination of these disclosed means of holding the template holder 8 onto the barrel 2 would be suitable as would other obvious solutions, e.g. the pin(s) 16 could be on the bracket(s) 37 and the hole(s) 40, or indentations (not shown) could be in the barrel 2. Also, the shape of the pin(s) 32 could be any shape that would function to hold the template holder 8 onto the barrel 2.

FIG. 10, a partial vertical cross section through the vertical axis of the shaft 18 of another decorating device similar to the device shown in FIG. 1, but with a modified top 44. The top 44 in this embodiment is a strip of metal or plastic having two turned down end portions 46 and a hole 45 in its center for the shaft 18 to pass through, the hole 45 being slightly larger in diameter than the diameter of the shaft 18 at this location on the shaft 18. An optional bushing 26 attached to the bottom surface of the modified top 44 in any known manner further supports and guides the shaft 18 as before. In this embodiment the optional knob 22 is attached to the top of the shaft 18 to make it easier to rotate the shaft by hand. FIG. 11 is a front view of one turned down end portion 46. Each of the two turned down end portions 46 has a first strip 48,50 cut along each side from the turned down end portion 46 leaving an adjacent strip 52 on each side of the first strip 50, or 48 on the opposite end portion. The first strip 50 is bent away from the turned down portion 46 (see FIG. 10) to allow it to slip on the inside of the barrel 2 while the adjacent strips 52 remain on the outside of the barrel 2. As shown in the plan view of FIG. 12, in this manner the modified top 44 is secured to the top portion of the barrel 2 leaving open portions 54 on the top of the barrel 2 for pouring the decorative material, like powder, into the barrel 2 without removing the modified top 44, and for pouring the powder out of the barrel 2 to prepare it to receive a different powder, etc., or for cleaning by inverting this modified decorating device, again without having to remove the modified top 44. Also shown in FIG. 12 is a further option to the modified top 44 wherein one or more additional top strips 47, etc. can be added, or used with the modified top 44, to even more substantially secure the modified top 44 to the top of the barrel 2. It will be readily seen that these embodiments can be further modified by bending the strip 50 outward and sizing the length of the modified top 44 such that the adjacent strips 52 slide on the inside of the top of the barrel 2 while the bent out strip 50 slides down the outside of the top of the barrel 2. Many other ways of securing a top to the top of the barrel 2 will be obvious to an ordinary artisan without significantly changing its function or the operation of the device of the invention disclosed here.

FIG. 13 is a partial plan view of the shaft 18 and the one or more agitators 20-20g. While the agitator 20 and the optional additional agitators 20a-20g are shown equally spaced apart, which is preferred regardless of the number of agitators is more than one, they need not be equally spaced apart or with equal angles between each agitator. The more agitators that are used, the lower the amount of rotation of the shaft 18 is required. Depending upon the actual embodiment of the various decorating devices that have been shown and/or described herein, from one to at least eight agitators will perform with the least amount of effort as will be readily recognized. The cross section shape of the agitators, such as shown in FIGS. 1 and 4a-4f and other shapes, need not be the same when more than one agitator is used, although the same cross section shape is preferred because such an embodiment is easiest and least costly to make.

As mentioned earlier, the invention includes decorating devices according to the invention that enables its use using only one hand. Two such embodiments are shown in FIGS. 14 and 15 show in plan views, along with FIG. 1, some embodiments of the decorating device that can be used with one hand. FIG. 14 is a partial plan view showing a mechanism 56 for rotating the shaft 18 back and forth to move the agitators 20-20g (not shown in this figure—see FIG. 13) back and forth over the holes 30 in the template 14. The mechanism 56 is currently used in flour sifters and comprises a first lever arm 58 fixedly attached to the shaft above the agitators 20-20g (see FIG. 13) with a rod 64 pivotally attached at or near the end of the first lever arm 58, the rod 64 extending through a hole (not shown) in a side of the barrel 2 and ending in the curved portion or trigger 9 inside the handle 6 (see FIG. 1) and a removable tension spring 62 attached at one end to the first lever at or near its end arm with the other end of the tension spring 62 passing through a hole 59 in the side of the barrel 2 and curving around to form a bent wire catch 63 that secures the end of the tension spring 62. Another embodiment of the mechanism 56 can comprises a second lever arm 60a fixedly attached to the shaft 18 at a location above the agitators 20-20g (see FIG. 13) and spaced from the first lever arm 58, preferably spaced about 180 degrees from the first lever arm, but other spacing angles are acceptable as is obvious. To operate this decorating device embodiment one holds the decorating device by the handle 9 with a thumb and one or more fingers of one hand and with another finger of the same hand pulls the trigger 9 and allows it to return to the starting position, which it will do by reason of the stretched removable tension spring 62 or 62a. The tension spring 62 or 62a need not be removable as it can be fixedly attached to the inside of the barrel 2 at an appropriate location, but this embodiment is less preferred as it makes the dynamic assembly 7 harder to remove from the barrel 2. The trigger 9 can be pulled and released multiple times to get the desired pattern if necessary. These embodiments will also obviously work with the optional push button 3 by relocating the spring(s) 62 and/or 62a in an obvious manner as shown below.

FIG. 15 shows two different embodiments of a decorating device according to the invention that can be used with one hand. These embodiments are like the embodiments shown in FIG. 14 except instead of pulling the rod 64 and lever arm 58 with the trigger 9, these embodiments use a push button 3 (see FIG. 1) located above the handle 6, or in the opening of the handle, and in these embodiments the rod 64 and lever arm 58 is pushed when the push button 3 is pushed, usually with a thumb of the hand holding the device with the handle 6. The tension spring 62 is located differently than in FIG. 14 to pull the lever arm 58 back when the push button 3 is releases. The other embodiment using the push button 3 of the mechanism 56 can comprises a second lever arm 60a fixedly attached to the shaft 18 at a location above the agitators 20-20g (see FIG. 13) and spaced from the first lever arm 58, preferably spaced about 180 degrees from the first lever arm, but other spacing angles are acceptable as is obvious. The push button 3 can be pushed and released multiple times to get the desired pattern if necessary.

FIG. 16 is a side view of another embodiment that can be operated with one hand. This decorating device 67 comprises an open or closed top 70 and a tubular enclosure or container 68 having a handle assembly 76 comprising a bracket 73 for attaching the handle assembly 76 to an outside wall of container 88, the handle 76 being like the optional handle 6 on the device shown in FIG. 1 or like typical stationary handles on some well known flour sifters, the handle assembly 76 being preferably attached to the container 68 at only one end. The upper portion of the handle 76 also comprises a pin 77 whereby an operative handle 74 is attached at its upper end in a pivoting manner, i. e. it pivots on the pin 77. When the operative handle 74 is pulled back, with one or more fingers of a persons hand, in the direction of the fixed handle assembly 76, it pulls a pin 78 that also pulls an end of an arm 65, fixedly attached at its other end to a shaft 66, to turn an agitator assembly 75 also fixedly attached at its center to the shaft 66 to move particulate material over and through holes in a template 72 supported by one or more supports 69 attached to the inside wall of the container 68. This mechanism works in a similar manner to the mechanism in FIG. 14, except the operative handle 74, rod 78, arm 65 and agitator assembly 75 is preferably reversed in direction by backing off ones fingers from the operative handle 74, allowing a spring (not shown) mounted below the pin 77 in an upper end portion of the fixed handle assembly, the spring biasing the operative handle 74 in the direction of the fixed handle assembly 76. Of course, this device 67 could be modified to operate with one or more springs inside the container 68 like the mechanism shown in FIG. 14 if desired. Also, the agitator 75 can have as many agitator elements or arms as desired, e.g. see FIGS. 19 and 23, to require shorter stroke(s) of the operative handle 74 to perform the decorating task.

FIG. 17 is a view from a handle side of another embodiment decorating device according to the invention that can be operated with one hand. This decorating device 83 comprises a container or enclosure 88, a handle 85 that can be attached at one or both ends, or with one or more members spaced from either end, to the outside wall of the container 88. Preferably attached to the handle 85, preferably on an outside of a top portion, but anywhere handy to reach with a thumb or one or more fingers, is an activator 84 for an on/off switch such as an electrical switch 86, preferably a push-button or toggle switch that can be held down or toggled to energize the vibrator 81 and preferably spring returned to turn the vibrator 81 off. Mounted somewhere on the outside of the container 88 is the vibrator 81 and a power source 82, e.g. a battery compartment or transformer. Also, the vibrator 81 can be driven with a wind-up clockspring with the activator 84 being an on/off linkage for a clockspring release and lock mechanism. One of several advantages of these types of decorative devices is that they do not need a rotating agitator, the horizontal cross-sectional shape of the container 88 and the template 80 can be of almost any shape including square, rectangular, triangular, pentagonal, polygonal, oval, etc. allowing a wider range of decorative patterns including names, larger logos, trademarks, slogans, etc. This embodiment can also have one or more conventional sifter screens mounted spaced above the top of the template an operable distance, e.g. at least 1/16 to 1/4 inch or more, with the screens spaced apart the same or similar when more than one screen is used.

Figure 24:
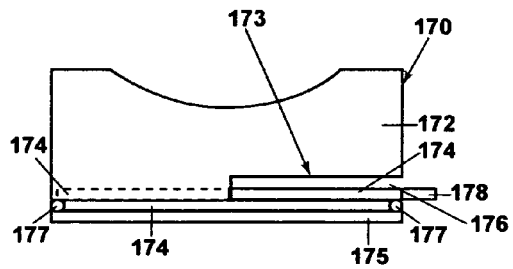
FIG. 24 shows a partial view of a container and an optional bottom portion that permits templates to be changed quickly.
Figure 27:
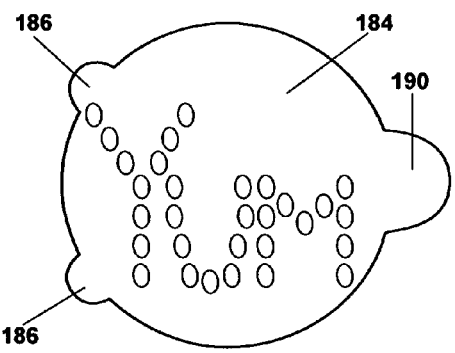
FIG. 27 is a plan view of a typical template used in the container option shown in FIG. 26.
Figure 25:
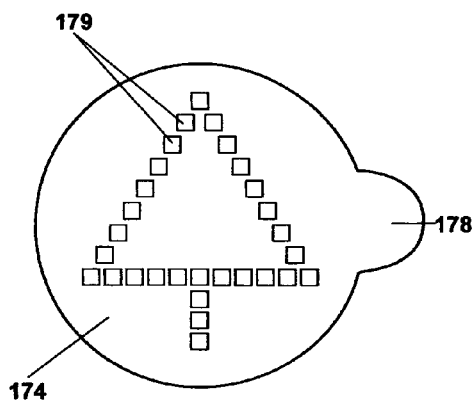
FIG. 25 is a plan view of a typical template used in the container option shown in FIG. 24.
Figure 28:
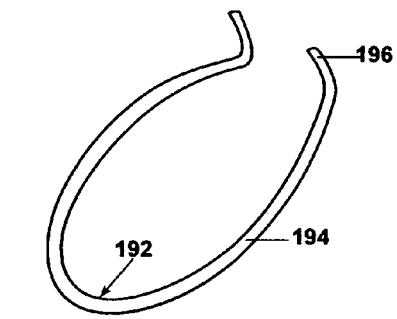
FIG. 28 is a perspective view of an outwardly biased loop spring usable in the invention.
Figure 26:
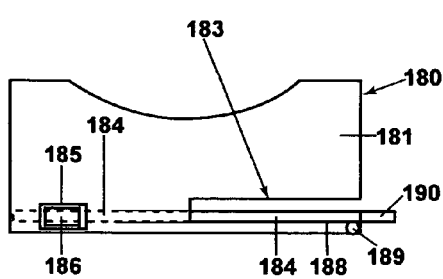
FIG. 26 is a partial view of a container and another optional bottom portion that permits templates to be changed quickly.
Figure 29:
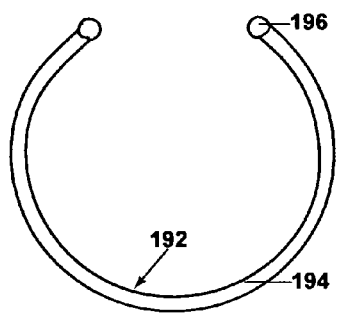
FIG. 29 is a plan view of the spring shown in FIG. 28.

Various templates can be inserted and removed from the containers 2, 68, 88 and 106 in many ways in addition to the manner shown in FIGS. 1 and 6-11, but one preferred way is to design the lower portion of the container 68 like that shown in FIGS. 24 and 26 and by shaping the outer peripheral portion of the templates like those shown in FIGS. 25 and 27, or obvious modifications thereof so a template can be easily and quickly removed and a different one quickly inserted. Another way of supporting the templates in any container so they can be removed quickly and a different template installed and supported quickly is shown in FIGS. 18, 28 and 29 and is described later in the description of those figures. In any of the devices, to change a template without having to remove particulater material from the container—simply turn the container on its side and bump it to cause particulate material to fall off of the top surface of the template and then remove and replace the template.

FIG. 18 is a vertical cross-section of another embodiment, a modification according to the invention of a flour sifter disclosed in U.S. Pat. No. 2,607,491, issued Aug. 19, 1952, the disclosure of which is incorporated herein by reference. This embodiment can be used with one hand and contains zero screens, or one or more screens positioned above the template to provide a more uniform flow of particulate material to the template, and one or two or more particulate material agitators, one above the template and, when one or more screens are present, one above each screen. This embodiment shown in FIG. 18 comprises a container or barrel 106 for holding or surrounding the particulate material and preferably open at the top, but can have a top with an opening (not shown) like the embodiment shown in FIG. 1. This embodiment also can comprises a screen 107, and optionally one or more additional screen(s) 107a, 107b, etc., mounted in spaced parallel relationship inside the barrel 106. The screen(s) 107, etc., is part of separate sieve units, there being three such units in this embodiment, the screens 107, 107a and 107b being held by their outer annular edges in sheet metal rings 108, 108a and 108b respectively, these rings being made to fit snugly inside the barrel 106, each screen being gripped at its outer annular edge by an inwardly curled lower edge 109 on the ring 108 on each screen 107, 107a and 107b. An oprionL brace strip 110, preferably of sheet metal and preferably ribbed longitudinally as at 111 for stiffening is provided under each screen 107, etc. for support and to keep the screen fairly flat. The optional brace strips 110, 110a and 110b are supported at their ends on top of the curled edges 109, etc., of the ring 108, etc. as shown. Each brace strip 110, etc., has a hole (not shown) in its center or mid-point and secured to the center of the screen 107, etc., with a grommet or eyelet 112 (see FIG. 19), whereby to hold the brace strip 110 permanently in the position shown. Two diametrically opposed sheet metal clips 113 that are preferably riveted to the wall of the container, as at 114, serve to hold the one, two or three screens 107, etc., in place in the container 106, with the upper screen 107 disposed in abutment with an annular shoulder 115 defined in the bore of the container 106 by a bead 109 formed in the wall of the container 106 in the manner shown.

One or more hexagonal agitators 116, 116a and 116b, one mounted above each screen 107 etc., cooperates with the screen 107 beneath the agitator 116, and the one or more agitators 116, etc., are oscillated with the shaft portion 117 of the crank element shown in FIG. 19 and designated generally by the element number 118. This crank element shown in FIG. 19 has a crank arm 119 pivotally connected at its specially shaped outer end portion 120 with the front end portion of a wire or rod link 121, which in turn is pivotally connected at its rear end with the lower end of a stamped sheet metal trigger or lever 122 for oscillation of the one or more agitators 116, etc. The trigger 122 is operated by the fingers of the operator's hand that grasps a handle 123, the trigger 122 being disposed in forwardly spaced relation to the handle for that purpose, as is clearly shown in FIG. 18. From FIG. 18 it will be noted that the handle 123, which may be of metal, wood, plastic, a combination of two or more of these materials, or any suitable material, is riveted or otherwise attached at its upper end, as at 124, in the rear end of a sheet metal channel member 125, that is suitably secured at its front end to the wall of the container 106, the lower end of the handle 123 being riveted or otherwise attached as at 126, in the rear end of a U-shaped sheet metal yoke 127, in front of the cross portion of the U, and the front ends of the arms of the U being suitably secured to the wall of the container 106. The trigger 122 is pivoted relative to the handle 123 structure at its upper end on a cross-pin 128 that is supported at its opposite ends in the opposed side walls 129 of a channel 125. A bowed leaf spring 130 has one end set in a recess 131 provided in the front of the handle 123 and bears at its other end against the a shoulder 132 formed on the back of the trigger 122 near its upper end. The spring 130 is held against lateral displacement from the handle structure 123 by having its arched middle portion disposed between the side walls 129 of the channel 125, as shown. The link 121 extends freely through a hole 133 in the wall of the container 106 and has its rear end portion bent downwardly to provide the pivot pin portion 134 for pivotal connection with the lower U-shaped end portion 135 of the trigger 122. A hole 136 is provided in the substantially vertical cross-portion of the U through which the wire link 121 extends freely, and there is another hole 137 in the lower substantially horizontal arm of the U through which the bent pivotal end portion 134 of the wire link 121 projects. The lower end 135 of the trigger 122 is threaded onto the end 134 of the link 121 before the trigger 122 is assembled in the handle 123 structure. Thereafter, the parts described cannot become disassembled, no matter how vigorously the sifter is operated.

As shown in FIGS. 18 through 23, below a lone screen, or bottom screen 116 of two or more stacked screens 116a, etc., or even if the container 106 contains no screen, a particulate material distributor or agitator 154 is attached to the shaft 117 at 156 and is located just above or in contact with an upper surface of a template 160 resting on an annular ring 158, or at least three or four ring segments, pins, or protruding rivets, or any other kind of lip or supports attached to the inner wall of the container 106 by any suitable manner including as shown.

In operation, when the trigger 122 is pressed or squeezed and is thereby moved toward the handle 123 against resistance of the spring 130, the link 121 moving with it slides freely in the hole 133 and moves crank arm 119 and the one or more agitators 116 with it through an angle of approximately 30-100 degrees or more, as indicated by the dotted moved position of the crank arm 119 in FIGS. 19 and 23. When the trigger 122 has been moved as far as it will go, or nearly so, finger pressure thereon is released and the spring 130 returns the trigger 122 and the aforesaid parts, including the distributor 154, thereto attached to their starting position(s). This operation is smooth and easy to do without moving the decorating device itself in a way that would significantly disturb the decoration being applied. The construction of the crank element 118 improves the device's operation by eliminating any possibility of the crank arm 119 reaching a dead-center position relative to link 121, or so close to such a relationship that would interfere with smooth operation, this relationship being shown in their extremes in FIG. 19. The sheet metal strip of oblong rectangular transverse section, from which the crank element 118 is made is formed between dies to offset the outer end portion 120 in parallel relation to the rest of the crank arm 119 and at the same time define transverse walls 138 and 139 at opposite ends of said offset portion in planes at right angles to the planes of the inner and offset outer end portions of the crank arm 119. These walls 138 and 139 also lie oblique to each other as well as oblique to the axis of the crank arm 119, have a length as measured horizontally at least equal to the broad side of the crank arm 119 and are arranged in a horizontal V opening in the general direction of the handle 123 as shows in FIGS. 19 and 22. A hole 140 is punched in the offset end portion 120 which can be termed the web linking the two walls 138, 139, the hole 140 being located equidistant between these walls, the wire link 121 has an upwardly bent end 141 entered freely in the hole 140 to provide the pivotal connection between the link 121' and the crank arm 119. The upwardly bent end 141 is bent again at right angles to provide an arm 142, which, with the pivot 141, defines a hook on the end of the link 121 that will not become disconnected from the crank arm 119 when once properly connected therewith, the arm 142 serving also by abutment with walls 138 and 139 to define the opposite limits of movement of the parts 119 and 121. In the assembling of the decorating device at the factory, the arm 142 can easily be bent to the right or left relative to the rest of the link 121 if a test shows that the arm 119 and link 121 come too close to a dead center relationship at the one or the other limit positions. Once accomplished, this should never need to be done again because the trigger 122 is not operated with sufficient force to give rise to danger of the arm 142 getting bent out of the angle set at the factory.

It will be noticed that the shaft portion 117 of the crank element 118 is reduced in width slightly in relation to the crank arm end whereby to define shoulders 143 for abutment with the eyelet 112 on the lowermost screen to prevent upward displacement of the crank element 118 from an assembled position. The shaft portion 117 of the crank element 118 fits nonrotatably in the diametrical slots 144 molded in the hubs 145 of the agitators 116, which as stated earlier, are preferably molded in one piece of a metal or plastic material to the final form desired, so that no machining is needed. The upper end of the shaft portion 117 is notched out on both sides, as at 146, to form an easily twistable T-shaped portion 147 for securing the crank element 118 in assembled relationship to the uppermost agitator and preventing downward displacement thereof from position, as shown in FIGS. 18, 20 and 21. This one-piece construction of the crank element 118 means quite a reduction in the number of parts needed for the device and, besides making for lowered cost of production, makes for closer uniformity in quantity production, and a truly higher quality device. The preferred one-piece plastic or metal construction of the agitator(s) 116 is of advantage in eliminating any danger of these parts rusting after they have been in service for some time. This construction also enables specially shaping the hub portion 145 to obtain improved performance, e.g. it will be seen in FIG. 18 how the increased axial length of the hubs insures keeping the one, two, three, etc. lower agitators 116a, etc. and a distributor 154 in the desired spaced relation to the screen(s) 107 above so they remain in the desired close working relationship to the screen(s) 107 therebeneath for efficient sifting, the uppermost agitator 116 being held down on its screen 107 by the twisted end 147 of the shaft portion 117. This same or similar construction can also be used for the distributor 154 resting on or very near the top surface of the template 102.

Notice in FIG. 21 the downwardly projecting annular bead 148 formed on the bottom of the hub portion 145 of each agitator arranged to ride on top of the screen 107 therebeneath around the eyelet 112 and support the agitator 116 at a predetermined small elevation relative to the screen 107 for most efficient sifting. Also, note the recess 149 in the bottom of the hub 144 for reception of the eyelet 112 with ample operating clearance. The bead 148 and the recess 149 together insure proper relationship of each agitator 116 to the screen 107 associated therewith.

FIG. 23 is a bottom view of the template 102 with an optional template retainer eyelet fastener 56, fastened to the end of the shaft 117 and with the distributor 154 shown in phantom behind or above the template 102. A smaller diameter lower end portion of the shaft 117 extends through a hole in the lowest eyelet 112, through an opening in the center of the distributor 154 and the distributor 154 is held onto the lower portion of the shaft 117 with the eyelet fastener 56. The distributor can be fitted to the lower portion of the shaft 117 so that the rotating shaft 117 also rotates the distributor 154 in several ways including with one or more pins or screws (not shown), press on, the lower end of the shaft 117 being a pentagon or other polygon in cross-section and the center hole in the distributor 154 being of the same shape albeit slightly larger, etc. This distributor 154 has 12 arms, but distributors having more or fewer arms can be used, the more arms used the less the distributor 154 has to be rotated to distribute the particulate material 104 over the holes in the template 102, in this embodiment the plurality of holes in the template form a pattern of the word "YUM" on whatever is being decorated, but as above, any desired pattern is useful in these decorating devices. Other means of holding the template in the enclosure 106 are suitable, such as the spring wire loop spring 192 shown in FIGS. 28 and 29, and shown installed in FIG. 18, and the other template supports shown in other figures and described above, as well as obvious modifications of these.

Referring to FIGS. 18, 28 and 29, the template 102 is held in the correct position in the bottom part of the container 106 with a spring wire loop 192. The spring wire loop 192 is comprised of a loop section 194 that when out of the container 106 and left alone is biased to expand in diameter to a diameter that is greater than the inside diameter of the container 106, leaving a gap between a turned up end portion 196 on each end of the loop 194. When the two turned up end portions 196 are squeezed together, the outside diameter of the loop 194 is slightly smaller than the inside diameter of the container 106 such that it will fit up into the bottom part of the can 106 support the template 102 in its proper position. When the two turned up end portions 196 (pointing down now) are released, the loop portion 194 will, due to the spring wire, move towards the inside of the container 106 and grip the inside wall to remain in position. To remove the spring wire loop 192 from the container one merely grips the two turned down end portions 196, squeezes them together and pulls the spring wire loop 192 out of the container 106. When no particulate material 104 is in the can, the template 102 can be placed on top of the spring wire loop 192 just before it is inserted into the container 106 to install both together. When changing the template 102 to a different template to get a different pattern of decoration, the container 106 can be turned on its side and bumped carefully to cause all or most of the particulate material 104 to fall to the side of the container 106 and off of the template 102 before removing the spring wire loop 192 and template 102, a new template inserted into its proper position against or very near the bottom of the distributor 154, the spring wire loop 192 reinserted to its proper position and the container turned to an upright position and shaken back and forth horizontally to spread the particulate material 104 over the distributor 154 and new template— this is done over a piece of wax pater or the like to catch any particulate material 104 that falls through the holes in the new template during the spreading out movements.

FIG. 24 is a partial front or end view of another optional feature 170 applicable to any of the embodiments of the invention and provides for a way to quickly and easily change templates to change decorative patterns in the various apparatus of the invention. A bottom portion of the container 172 contains a slot 173 that extends from any point on the outer circumference of the container 172 horizontally into the container wall far enough to permit a template, like template 174 (see FIG. 25) to be inserted to a proper position for operation according to the invention and to be removed with an opposite motion. A circumferential outer portion of a bottom 176 of the template 174 is supported in this embodiment by a circumferential ring 177 fastened, soldered, welded, or by any suitable means to the inside surface of the container 172 in the appropriate location to place the top of the template 174 close to or in contact with an agitator (not shown in FIG. 24). The wall of the container preferably extends for a suitable distance below where the support ring 177 is attached to support the cantilevered wall portion 175 and the cantilevered portion of the support ring 177. Again, as mentioned above, the support for the bottom 176 of the template 174 need not be a continuous ring, but can also be any one or combination of many things including anything that extends, continuously or discontinuously, from the inside of the wall of the container 172 sufficiently to provide support, but not far enough to interferen with the particulate material falling through the holes 179 in the template 174. As shown in FIG. 25, just one example of an almost endless number of templates, template 174, containing openings 179 forming a desired pattern. The templates can have an optional tab 178 to provide a handy handle to hold the templates for insertion or removal from the slot 173.

FIG. 26 is a partial front or end view of another optional feature 180 applicable to any of the embodiments of the invention and provides for a way to quickly and easily change templates to change decorative patterns in the various apparatus of the invention. A bottom portion of the container 181 contains a slot 183 that extends from any point on the outer circumference of the container 182 horizontally into the container wall far enough to permit a template, like template 184 (see FIG. 27) to be inserted to a proper position for operation according to the invention, and to be removed with an opposite movement. In these embodiments, one or more, preferably two or more slots 185 existing in the wall of the container 181 at the level of the template for accepting tab support(s) 186 that are part of the template 184, the bottom of the slot(s) 185 being at the desired level of a bottom surface 188 of the template 184. Preferably, the slots One or more, preferably two or more tabs 186 (see FIG. 27) extending from the outer circumference of the template 184 enter the opening(s) 185 to support one side of the template 184. In this embodiment, a circumferential ring 187 fastened, soldered, welded, formed by curling up all or portions of a bottom portion of the wall of the container 181 to form at least a partial ring or ring segments, or by any suitable means to the outside surface of the container 181 in the appropriate location to place the top of the template 184 close to or in contact with an agitator (not shown in FIG. 26). The wall of the container 181 preferably extends for a suitable distance below where a bottom surface 188 of the template 184 should be to support the cantilevered wall portion 189 and the cantilevered portion of the support ring 187 or other support. Again, as mentioned above, the support for the bottom surface 188 of the template 184 need not be a continuous ring, partial ring, etc., but can also be any one or combination of many things including anything that extends, continuously or discontinuously, from the outside of the wall of the container 181 sufficiently to provide support for the template tab(s) 186. As shown in FIG. 25, is just one example of an almost endless number of templates, template 184, containing openings (not shown) forming a desired pattern. The templates can have an optional tab 190 to provide further support and/or a handy extension to hold the templates for insertion or removal from the slot 185.

The templates can be changed by removing the particulate material from the partial enclosure and template, as is obvious, or without removing the particulate material by the ways described above. By turning the devices on their sides and bumping them gently on a hard surface like a table top, countertop, and the like, the most of the particulate material will fall onto the side of the devices allowing the template holder or retainer, when present, to be removed and the template to be removed and, if desired to be replaced with a different template.

After using the devices to decorate the surface of an article with one or more desired patterns of decorative particulate material, the decorative article can be consumed as is, when the particulate material is edible, or the article can be further heat treated to bond or fuse the particulate material together and/or to the article, or otherwise change the particulate material and/or the article. This is almost always done when the article is non-edible and the particulate material is non-edible.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A decorating apparatus operable with one hand for decorating with particulate material comprising:
   a) a partial enclosure for particulate decorating material which comprises a template holder,
   b) a template containing a plurality of holes or openings therethrough, the plurality of holes or openings forming a desired decorative pattern, the template excluding a grid or checkerboard pattern of round, square or rectangular holes,
   c) the template holder for supporting the template in place within the enclosure, the template holder comprising a first slot extending through a wall of the enclosure at the level of the template for accepting the template and one or more additional supports for the template, and
   d) a mechanism that when energized or activated will cause the particulate material to pass to and/or through at least most of the plurality of holes in the template,
   wherein the template has one or more tabs extending from the template, and
   wherein the one or more additional supports for the template is/are one or more additional slots extending through the enclosure and into which the one or more tabs are able to fit to support the template together with the first slot.

2. The decorating apparatus of claim 1 further comprising a handle for holding the apparatus with one hand.

3. The decorating apparatus of claim 1 wherein the mechanism comprises a rotatable shaft.

4. The decorating apparatus of claim 2 wherein the mechanism comprises a rotatable shaft.

5. The decorating apparatus of claim 1 wherein the mechanism further comprises an agitator or a distributor for moving the particulate material.

6. The decorating apparatus of claim 2 wherein the mechanism further comprises an agitator or a distributor for moving the particulate material.

7. The decorating apparatus of claim 1 wherein the mechanism comprises a vibrator attached to the apparatus for moving the particulate material.

8. The decorating apparatus of claim 1 wherein the mechanism comprises a vibrator attached to the apparatus for moving the particulate material.

9. A decorating apparatus for decorating with particulate material operable while holding and operating the apparatus with only one hand comprising:
   a) a partial enclosure for particulate decorating material, the partial enclosure comprising a template holder,
   b) a removable template containing a plurality of holes or openings therethrough, the plurality of holes or openings forming a desired decorative pattern,
   c) the template holder for supporting the template in place within the partial enclosure, the template holder comprising a first slot extending through a wall of the enclosure at the desired level of the template for accepting the template, and has one or more additional supports for the template, and
   d) a mechanism that when energized or activated by one or more fingers and/or a thumb on a hand supporting the partial enclosure will cause the particulate material to pass to and/or through at least most of the plurality of holes in the template,
   wherein the template has one or more tabs extending from the template, and
   wherein the one or more additional supports for the template is/are one or more additional slots extending through the enclosure and into which the one or more tabs are able to fit to support the template together with the first slot.

10. The decorating apparatus of claim 9 for decorating edible items further comprising a handle for holding the apparatus with one hand.

11. The decorating apparatus of claim 9 wherein the mechanism comprises a rotatable shaft.

12. The decorating apparatus of claim 10 wherein the mechanism comprises a rotatable shaft.

13. The decorating apparatus of claim 9 wherein the mechanism further comprises an agitator or a distributor for moving the particulate material.

14. The decorating apparatus of claim 10 wherein the mechanism further comprises an agitator or a distributor for moving the particulate material.

15. The decorating apparatus of claim 9 wherein the mechanism comprises a vibrator attached to the apparatus for moving the particulate material.

16. The decorating apparatus of claim 10 wherein the mechanism comprises a vibrator attached to the apparatus for moving the particulate material.

17. The decorating device of claim 9 wherein the mechanism comprises a rod for causing an agitator or a distributor to rotate and a spring for returning the agitator or distributor to reverse its direction of rotation.

* * * * *